United States Patent
Yokoyama et al.

(10) Patent No.: US 6,975,337 B2
(45) Date of Patent: Dec. 13, 2005

(54) PROJECTION TYPE IMAGE DISPLAY DEVICE

(75) Inventors: Toshihiko Yokoyama, Tochigi (JP); Yasuo Suzuki, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 10/052,465

(22) Filed: Jan. 23, 2002

(65) Prior Publication Data

US 2004/0012616 A1    Jan. 22, 2004

(30) Foreign Application Priority Data

Jan. 26, 2001   (JP) ............................. 2001-019078

(51) Int. Cl.⁷ ............................................. G09G 5/02
(52) U.S. Cl. ..................... 345/697; 348/745; 353/34; 349/5
(58) Field of Search .................... 345/84, 87–89, 345/690, 697; 348/745–747; 353/30, 31, 353/33, 34, 81, 82; 359/453; 349/5

(56) References Cited

U.S. PATENT DOCUMENTS

| 4,219,843 | A | * | 8/1980 | Takahashi ................... 348/779 |
| 5,260,797 | A | * | 11/1993 | Muraji et al. ............... 348/745 |
| 6,043,797 | A | * | 3/2000 | Clifton et al. .............. 345/589 |
| 6,288,756 | B1 | * | 9/2001 | Shiota et al. ............... 348/712 |
| 6,309,073 | B1 | * | 10/2001 | Nakayama et al. .......... 353/38 |
| 6,456,340 | B1 | * | 9/2002 | Margulis .................... 348/745 |
| 6,462,735 | B2 | * | 10/2002 | Naito .......................... 345/204 |
| 6,558,001 | B2 | * | 5/2003 | Ogawa et al. ................ 353/31 |
| 6,601,957 | B2 | * | 8/2003 | Sugawara .................... 353/31 |
| 6,626,540 | B2 | * | 9/2003 | Ouchi et al. ................. 353/31 |
| 6,644,812 | B2 | * | 11/2003 | Kodama et al. ............. 353/31 |
| 6,674,415 | B2 | * | 1/2004 | Nakamura et al. ........... 345/32 |

FOREIGN PATENT DOCUMENTS

| EP | 1185111 A2 | * | 3/2002 | ............ H04N 9/31 |
| JP | 08242427 A | * | 9/1996 | ............ H04N 7/01 |
| JP | 2002108298 A | * | 4/2002 | ............ G09G 3/36 |

* cited by examiner

Primary Examiner—Lun-Yi Lao
Assistant Examiner—Tom Sheng
(74) Attorney, Agent, or Firm—Fitzpatrick, Cella, Harper & Scinto (57) ABSTRACT

A projection type image display device includes a plurality of image display elements that perform modulation of light rays in accordance with an image signal, a color synthesizing optical element for synthesizing light rays having mutually different wavelength ranges that have been modulated by these image display elements by use of a dichroic membrane, lens groups having a positive refractive power as a whole that are disposed between the image display element and the color synthesizing optical element, and a projection optical system for projecting an image synthesized by the color synthesizing optical element. The projection type image display device further includes a storage circuit for storing data used to correct the brightness irregularity of a projected image, and a brightness irregularity correcting circuit for correcting brightness irregularity of a projected image on the basis of the data stored in the storage circuit.

7 Claims, 9 Drawing Sheets

PROJECTION TYPE IMAGE DISPLAY DEVICE

BACKGROUND OF THE INVENTION

1. Field of the Invention

The present invention relates to a projection type image display device, such as a liquid crystal projector, including a color synthesizing optical system that uses a dichroic membrane, or film.

2. Description of the Related Art

Conventionally, various devices have been proposed as a projection type image display device, such as a liquid crystal projector, including a color synthesizing optical system.

Figure 8:
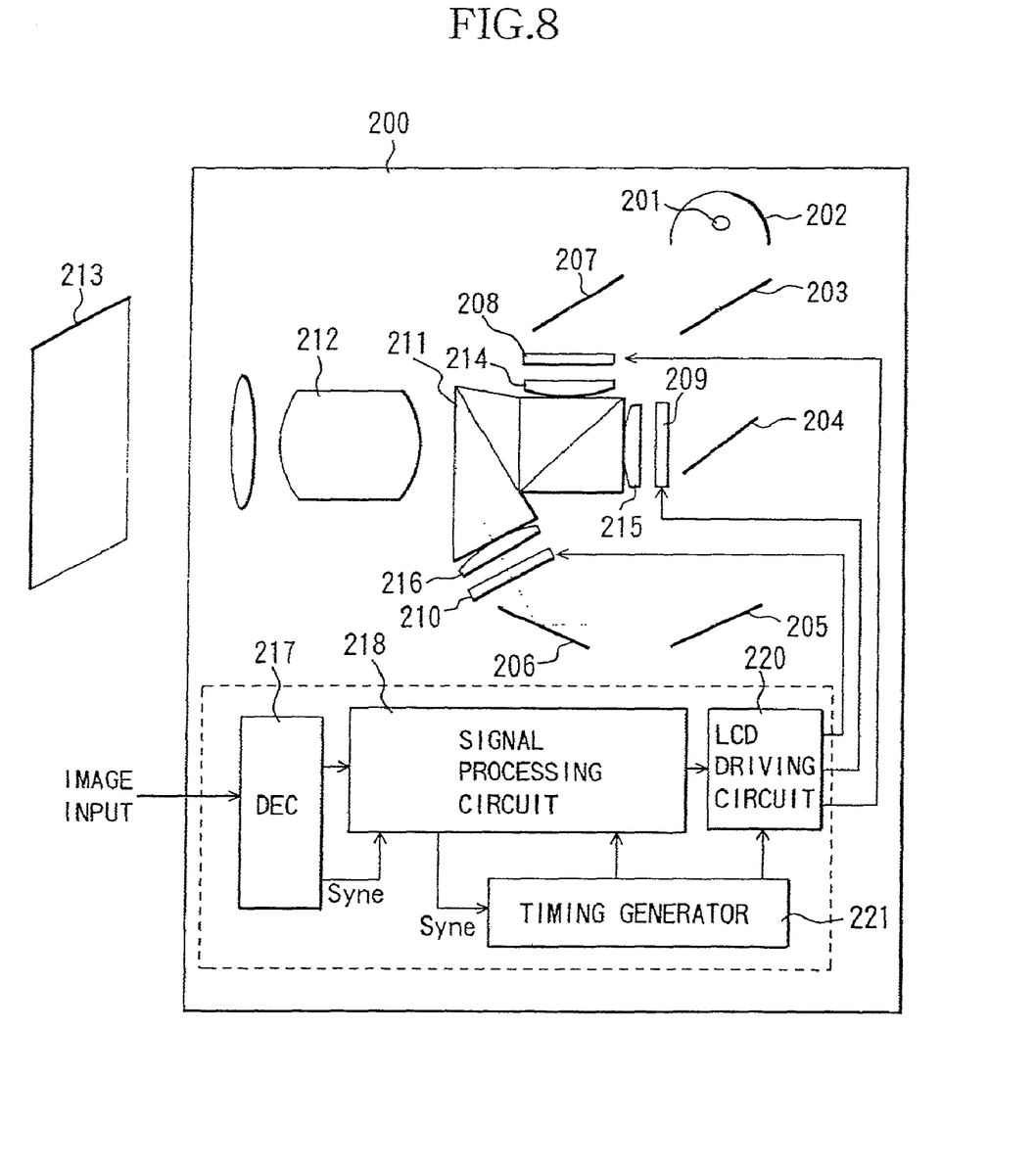
FIG. 8 shows a structure of a conventional liquid crystal projector.

A conventional projection type image display device will now be described with reference to FIG. 8. In FIG. 8, white light emitted from a light source 201 is transformed into substantially parallel rays of light by a parabolic mirror 202, a reflecting mirror (not shown), and a lens group (not shown).

The substantially parallel rays of light are subjected to color separation by dichroic mirrors 203 and 204, highly reflecting mirrors 205, 205 and 207, and a lens group (not shown), and are condensed to liquid crystal panels 208, 209 and 210 disposed for each color. Each color light that has entered the liquid crystal panels 208, 209 and 210 is then modulated by the liquid crystal panels 208, 209 and 210 displaying an image, thereby generating spatially modulated light according to the display image.

Each color modulated light is subjected to color synthesis by a color synthesizing dichroic prism 211, and is enlarged and projected onto a screen 213 through a projection lens group 212. Meanwhile, a group of positive refractive lenses 214, 215 and 216 are disposed between each liquid crystal panel 208, 209 and 210 and the dichroic prism 211 in order to reduce the optical system in size. Therefore, each color modulated light in the form of substantially parallel light that has passed through each liquid crystal panel 208, 209 and 210 is effected by the condensing (converging) action of the positive refractive lenses 214, 215 and 216, and is made non-parallel. This non-parallel light strikes the color synthesizing dichroic prism 211.

Therefore, disadvantageously, for the example, the incidence angle of the light upon the dichroic membrane has a difference between the right and the left of the image, and thereby a difference arises in the spectral/transmitted cutoff wavelength in the dichroic membrane. As a result, in each color light, nonuniformity (color unevenness or brightness irregularity) in the brightness level occurs in the right and the left of the screen.

As a solution to the color unevenness, a countermeasure has been made to form a so-called gradient membrane, or film, as the dichroic membrane in which thickness or a refractive index slantingly varies in a specific direction.

However, there is a problem in that, usually, color unevenness can be simply corrected only in one direction in the thus formed gradient membrane, so that color unevenness in each direction cannot be sufficiently corrected, and, in addition, a color synthesizing prism becomes expensive due to the formation of the gradient membrane.

SUMMARY OF THE INVENTION

It is therefore an object of the present invention to provide a projection type image display device capable of correcting color unevenness that easily occurs when a lens group with positive refractive power is disposed between a color synthesizing optical element, such as a color synthesizing prism, and an image display element by a simple, inexpensive structure, irrespective of a horizontal or vertical direction of a projected image.

In order to achieve the object, according to the present invention, in a projection type image display device that includes a plurality of image display elements for performing modulation of light rays in accordance with an image signal, a color synthesizing optical element for synthesizing light rays different from each other in the wavelength range that have been modulated by these image display elements by use of a dichroic membrane, and a lens group that has positive refractive power as a whole and that is disposed between the image display elements and the color synthesizing optical element, and a projection optical system for projecting an image synthesized by the color synthesizing optical element, the projection type image display device further includes a storage circuit for storing data to correct brightness irregularity (the nonuniformity of a brightness level) of a projected image and a brightness irregularity correcting circuit for correcting brightness irregularity of a projected image on the basis of the data stored in the storage circuit.

Thereby, it is possible to correct the nonuniformity (color unevenness) in the brightness level that easily occurs when the lens group with positive refractive power is disposed between the color synthesizing optical element and the image display element by a simple, inexpensive structure, irrespective of a horizontal or vertical direction of the projected image, and is possible to project and display an image with high picture quality and with no color unevenness.

Additionally, when a gradient membrane is used as a dichroic membrane in order to correct color unevenness in a specific direction, color unevenness in a direction that cannot be optically corrected by this gradient membrane can be electrically corrected with ease.

More specifically, the brightness irregularity correcting circuit merely needs to correct an input signal to the image display element in each pixel of the image display elements or in each pixel area (i.e., pixel group) thereof. Other objects and structures of the present invention will become apparent from disclosure of the embodiments provided later.

BRIEF DESCRIPTION OF THE DRAWINGS

FIG. 3(*a*) and FIG. 3(*b*) explain the operation of a color unevenness correction circuit in the signal-processing circuit.

DETAILED DESCRIPTION OF THE PREFERRED EMBODIMENTS

Figure 1:
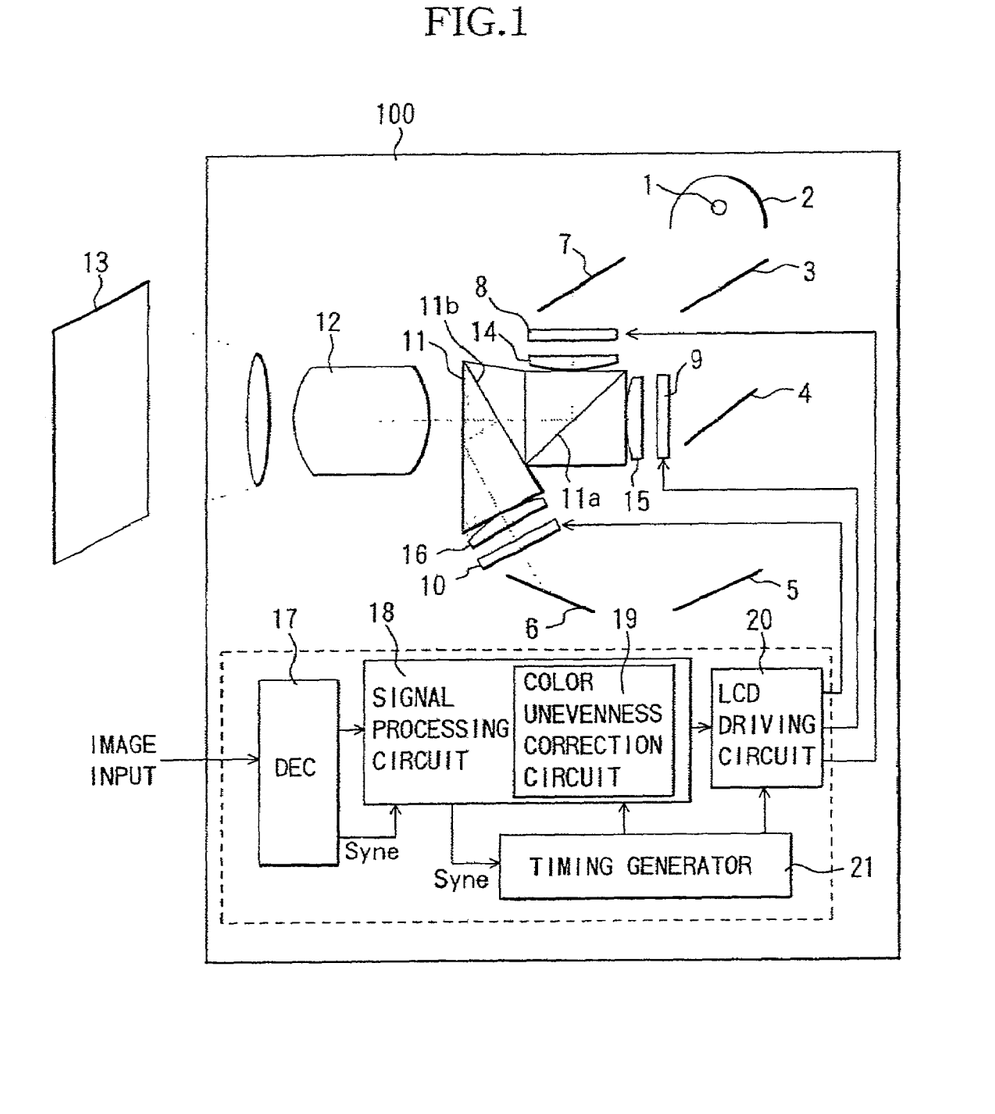
FIG. 1 shows a structure of a liquid crystal projector, which is a first embodiment of the present invention.

FIG. 1 shows a structure of a liquid crystal projector (projection type image display device), which is an embodiment of the present invention.

First, an optical system in a liquid crystal projector 100 will be described. In FIG. 1, white light emitted from a light source 1 is transformed into substantially parallel rays of light by a parabolic mirror 2, a reflecting mirror (not shown), and a lens group (not shown).

The substantially parallel light is subjected to color separation by dichroic mirrors 3 and 4, highly reflecting mirrors 5, 6 and 7, and a lens group (not shown) so as to turn into each color of red, green and blue, and is condensed onto liquid crystal panels (image display elements) 8, 9 and 10 disposed for each color.

Light rays that have entered the liquid crystal panels 8, 9 and 10 are then modulated by the liquid crystal panels 8, 9 and 10, respectively, that display images, thereby producing spatially modulated light in accordance with the displayed images.

The modulated light of each color is subjected to color synthesis by a color synthesizing dichroic prism (color synthesizing optical element) 11, and is enlarged and projected onto a screen 13 through a projection lens group 12.

Two dichroic membranes, or films, 11a and 11b that are each inclined with respect to an optical axis are disposed in the color synthesizing dichroic prism 11 without intersecting each other in the prism.

The dichroic membrane 11a synthesizes two kinds of color-modulated light among red modulated light, green modulated light, and blue modulated light that have mutually different wavelength ranges by its reflecting/transmitting action. The dichroic membrane 11b synthesizes the two kinds of color-modulated light that have been synthesized by the dichroic membrane 11a and the remaining color-modulated light by its reflecting/transmitting action. The modulated light that has thus undergone the color synthesis is emitted from an emitting surface of the prism 11 to the projection lens group 12.

In this embodiment, positive refractive lens groups 14, 15 and 16 are disposed between the liquid crystal panels 8, 9 and 10 and the color synthesizing dichroic prism 11, and thereby the optical system is reduced in size.

Herein, each color-modulated light, which is substantially parallel light and which has been emitted from the liquid crystal panels 8, 9 and 10, is transformed into non-parallel light by the condensing action (converging action) of the positive refractive lens groups 14, 15 and 16. This non-parallel light enters the dichroic films 11a and 11b of the color synthesizing dichroic prism 11. Therefore, for the reason given in the description of the conventional technique, there is a fear that the nonuniformity of a brightness level (color unevenness) will occur in an image projected onto the screen 13. However, according to this embodiment, this color unevenness can be corrected regardless of directions on the image, as described later.

Next, a description will be given of electric-signal processing in the liquid crystal projector according to this embodiment.

An image signal, such as a video signal or VGA signal, that has been input to a decoder 17 from the outside is digitized by the decoder 17, and is sent to a signal-processing circuit 18.

The signal-processing circuit 18 performs digital signal processing, such as resolution transformation or frame rate transformation, for the image signal, and performs LCD signal processing, such as gamma correction by which the VT characteristics of the liquid crystal panels 8, 9 and 10 are corrected.

The signal-processing circuit 18 further performs corrections necessary to correct the color unevenness in a color unevenness correction processing circuit (brightness irregularity correcting circuit) 19 for the image signal to be input to the liquid crystal panels 8, 9 and 10 that has undergone the aforementioned processings.

Since the image signal is corrected to cancel the color unevenness brightness irregularity or nonuniformity of a brightness level) by these corrections, no color unevenness occurs in the image (projection image) formed by light rays that has been modulated by the liquid crystal panels 8, 9 and 10 and that has been synthesized by the color-synthesizing prism 11.

Figure 2:
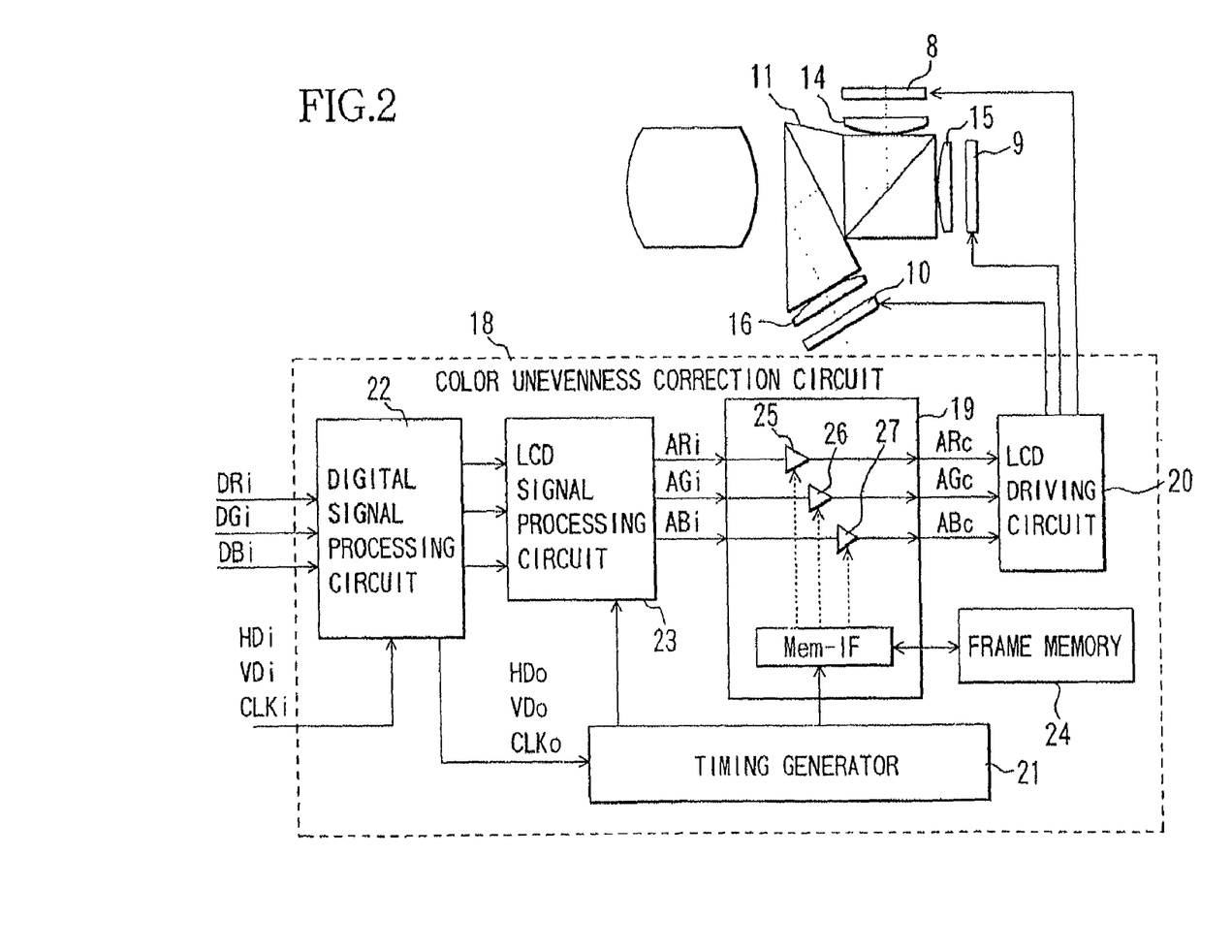
FIG. 2 shows a structure of a signal-processing circuit in the liquid crystal projector.

FIG. 2 shows in detail the signal-processing circuit 18 that includes the color unevenness correction circuit 19. Image signals (DRi, DGi, DBi) digitized by the decoder 17 are input to the color unevenness correction circuit 19 through the digital signal processing circuit 22 for a scan converter or resolution transformation and through the LCD signal processing circuit 23.

A frame memory 24 in which correction data used to correct the color unevenness in horizontal and vertical directions is stored is connected to the color unevenness correction circuit 19. The frame memory 24 is made up of a ROM and other elements, in which the correction data is prestored.

The color unevenness correction circuit 19 reads out correction data, which synchronizes with the image signals ARi, AGi and ABi input from the LCD signal processing circuit 23, from the frame memory 24 by use of a timing signal from a timing generator 21, and corrects the image signals ARi, AGi and ABi in real time.

Figure 7:
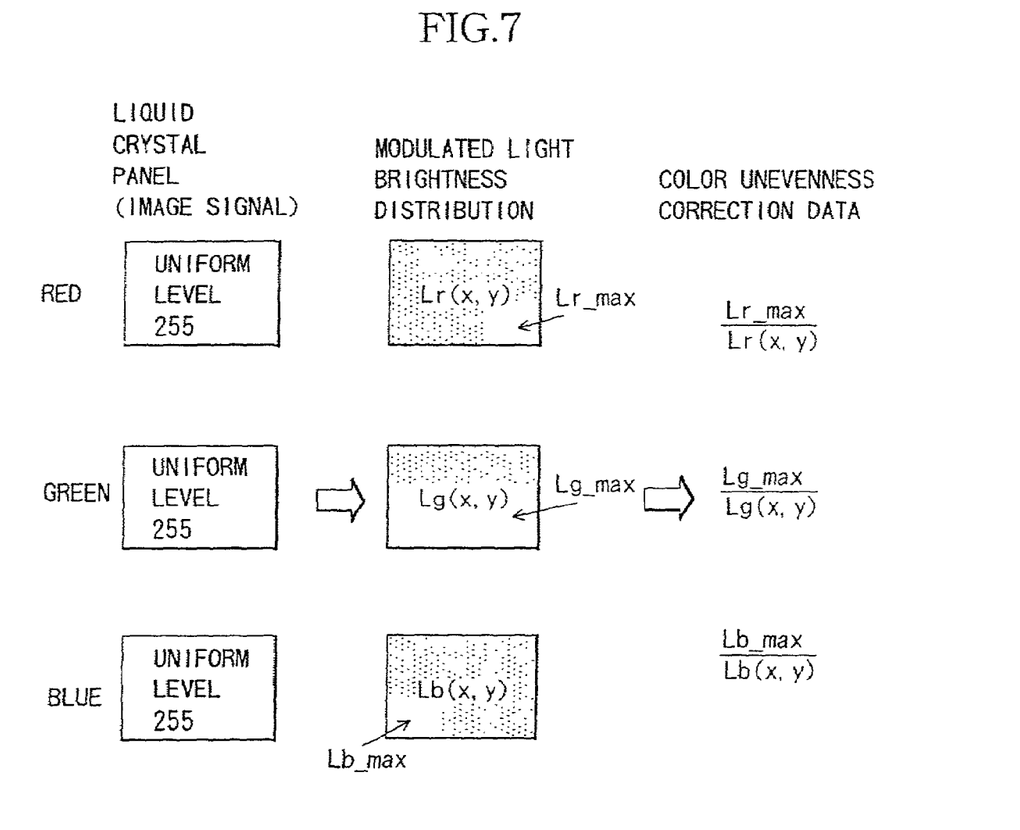
FIG. 7 explains an example of correction data creation in the first embodiment.

FIG. 7 shows an example of a method for creation of correction data. First, with respect to each color, image signals, each having a uniform brightness level, are sequentially input to the liquid crystal panels 8, 9 and 10, and are displayed as images.

When projected onto the screen in this state, color unevenness occurs in the projected image on the screen in a horizontal or vertical direction. Herein, brightness data in the projected image on the screen of each color will be designated as Lr (x,y), Lg (x,y) and Lb (x,y), and a maximum brightness value in the brightness data of each color will be designated as Lr_max, Lg_max and Lb_max.

The correction data mentioned here is a gain factor for performing a gain adjustment for each pixel of the liquid crystal panels 8, 9 and 10 in a direction where unevenness in the brightness data is canceled, and is expressed as follows:

$$Cr(x,y)=Lr\_max/Lr(x,y) \qquad (1)$$

$$Cg(x,y)=Lg\_max/Lg(x,y) \qquad (2)$$

$$Cb(x,y)=Lb\_max/Lb(x,y) \qquad (3)$$

wherein (x,y) indicates coordinates at the spatial position of each pixel.

However, if there is no need to perform the procedure up to the gain adjustment for each pixel, the amount of correction data may be decreased so as to reduce the size of the frame memory 24 by setting the correction data shown by the equations (1), (2) and (3) for each arbitrary pixel area for simplification.

Figure 3:
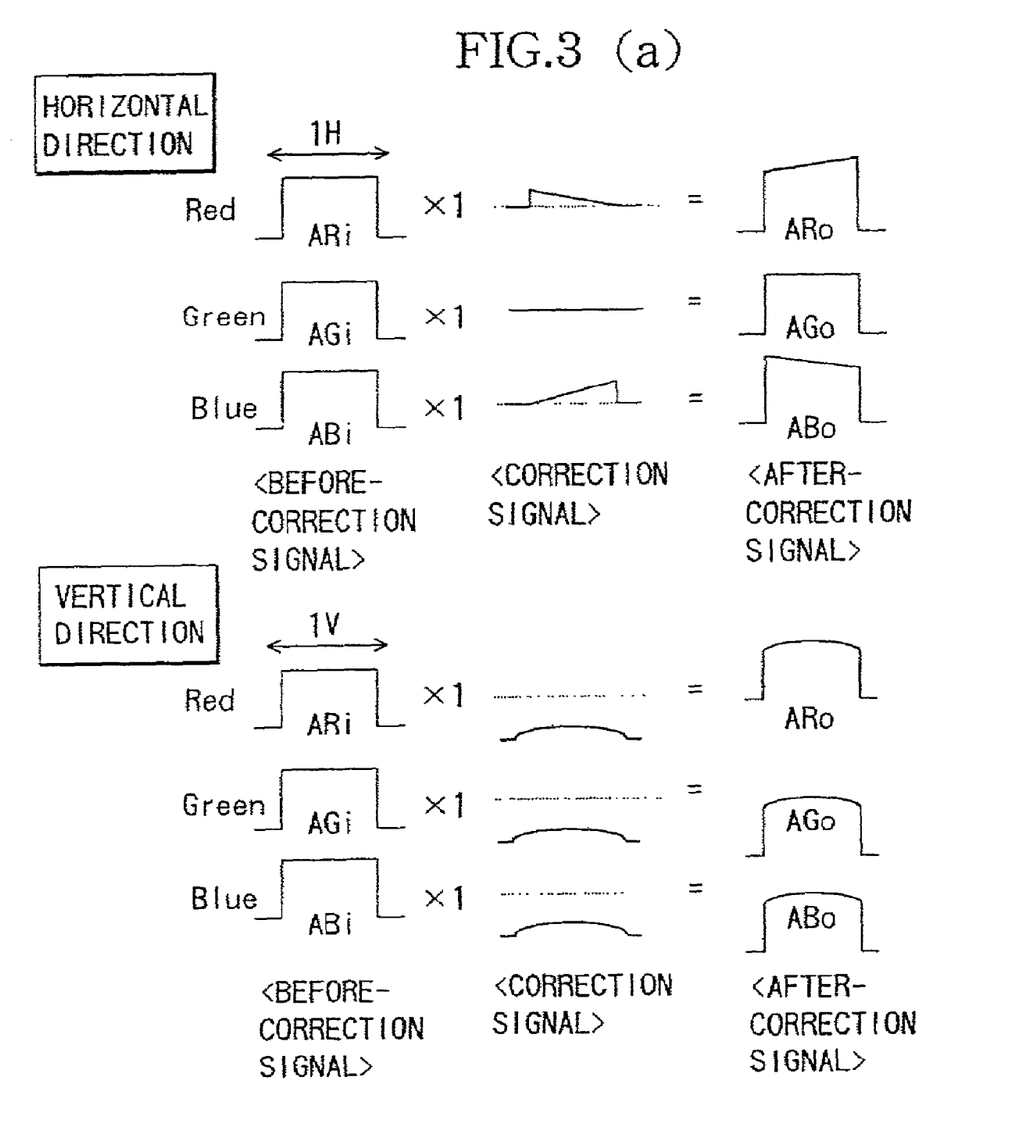

FIG. 3(a) shows an example of a correcting operation when a uniform white (gray) color is displayed. Since image signals input to the liquid crystal panel is a uniform white (gray) color, the image signals ARi, AGi and ABi prior to corrections have no positional level difference, and have a constant level in both horizontal and vertical directions.

However, in order to prevent color unevenness from occurring in the projected image as described above, the correction data is created to cancel this color unevenness according to the method shown in FIG. 7.

In other words, although the image signal has a uniform brightness level (e.g., 255), such correction data so as to enlarge the gain is set as a projected image (modulated light) on the screen 13 in a pixel or in a pixel area in which brightness becomes lower than the maximum brightness Lr_max, Lg_max and Lb_max because of the color unevenness.

FIG. 3(b) shows an example of correction data stored in the frame memory 24. Image signals (after-correction signals) obtained after completion of corrections are expressed as follows:

$$ARo(x,y)=Cr(x,y) \times ARi(x,y) \quad (4)$$

$$ABo(x,y)=Cb(x,y) \times ABi(x,y) \quad (5)$$

$$AGo(x,y)=Cg(x,y) \times AGi(x,y) \quad (6)$$

wherein Cr (x,y), Cb (x,y) and Cg (x,y) are red correction data, blue correction data and green correction data, respectively.

The after-correction signal (ARo, AGo, ABo) of each color that has passed through the color unevenness correction circuit 19 is changed into a signal having an inclination or variation as shown in FIG. 3(a).

Since the liquid crystal panels 8, 9 and 10 driven by use of the after-correction signal (ARo, AGo, ABo) have space transmittance characteristics by which color unevenness is canceled, an image having uniform brightness is displayed on the screen 13.

As described above, according to this embodiment, electric signals input to the liquid crystal panels 8, 9 and 10 are corrected to eliminate the color unevenness of a projected image caused by an optical system, and, accordingly, the aforementioned color unevenness can be corrected by a simple, inexpensive structure, regardless of whether a horizontal or vertical direction in a projection screen.

Figure 4:
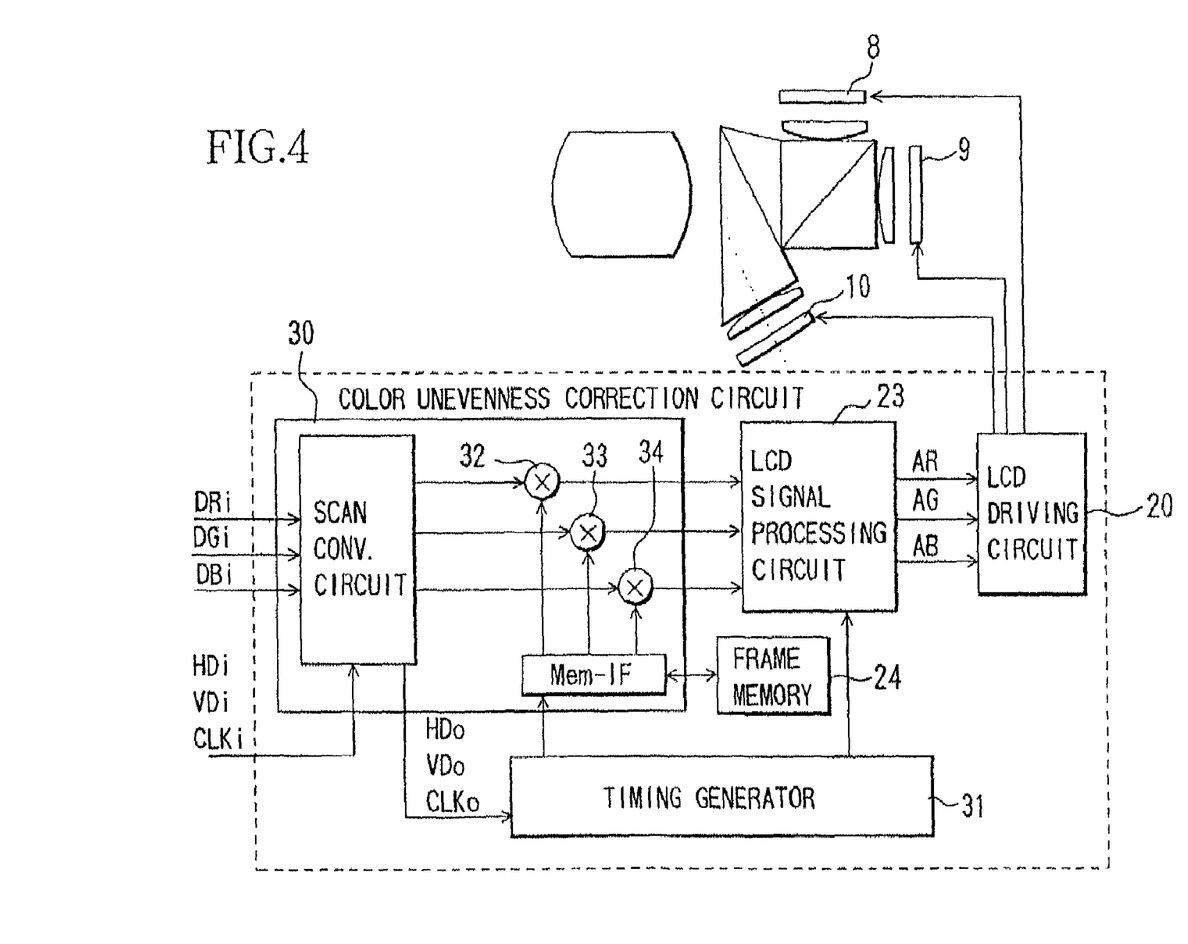
FIG. 4 shows a structure of a signal-processing circuit in a liquid crystal projector, which is a second embodiment of the present invention.

In the above embodiment (FIG. 2), a description was given of a case in which color-unevenness-correction processing is applied to the output signal from the LCD signal processing circuit 23 by means of the color unevenness correction circuit 19. Instead of this, as shown in FIG. 4, color unevenness correction processing can be applied to the output signal from the digital signal processing circuit 30 prior to the step of being input to the LCD signal processing circuit 23.

In this case, amplifiers 25, 26 and 27 of FIG. 2 are realized by multipliers 32, 33 and 34.

Further, in this case, since color unevenness correction processing is performed at the stage preceding LCD signal processing circuit 23 by which the VT characteristics of the liquid crystal panels 8, 9 and 10 are corrected, correction data is expressed as follows:

$$Cr(x,y)=Tvt\_r[Lr\_max/Lr(x,y)] \quad (7)$$

$$Cg(x,y)=Tvt\_g[Lg\_max/Lg(x,y)] \quad (8)$$

$$Cb(x,y)=Tvt\_b[Lb\_max/Lb(x,y)] \quad (9)$$

wherein Tvt_r [L], Tvt_g [L] and Tvt_b [L] are voltage-transmittance characteristic transformation functions of the liquid crystal panels 8, 9 and 10.

Color unevenness correction processing may be performed at any position between the input of the digital signal processing unit 22 and input of the LCD driving unit 20 according to methods other than the methods of FIG. 2 and FIG. 4 as long as a correction circuit capable of gain control is disposed at each spatial position of a pixel or a pixel area.

Figure 5:
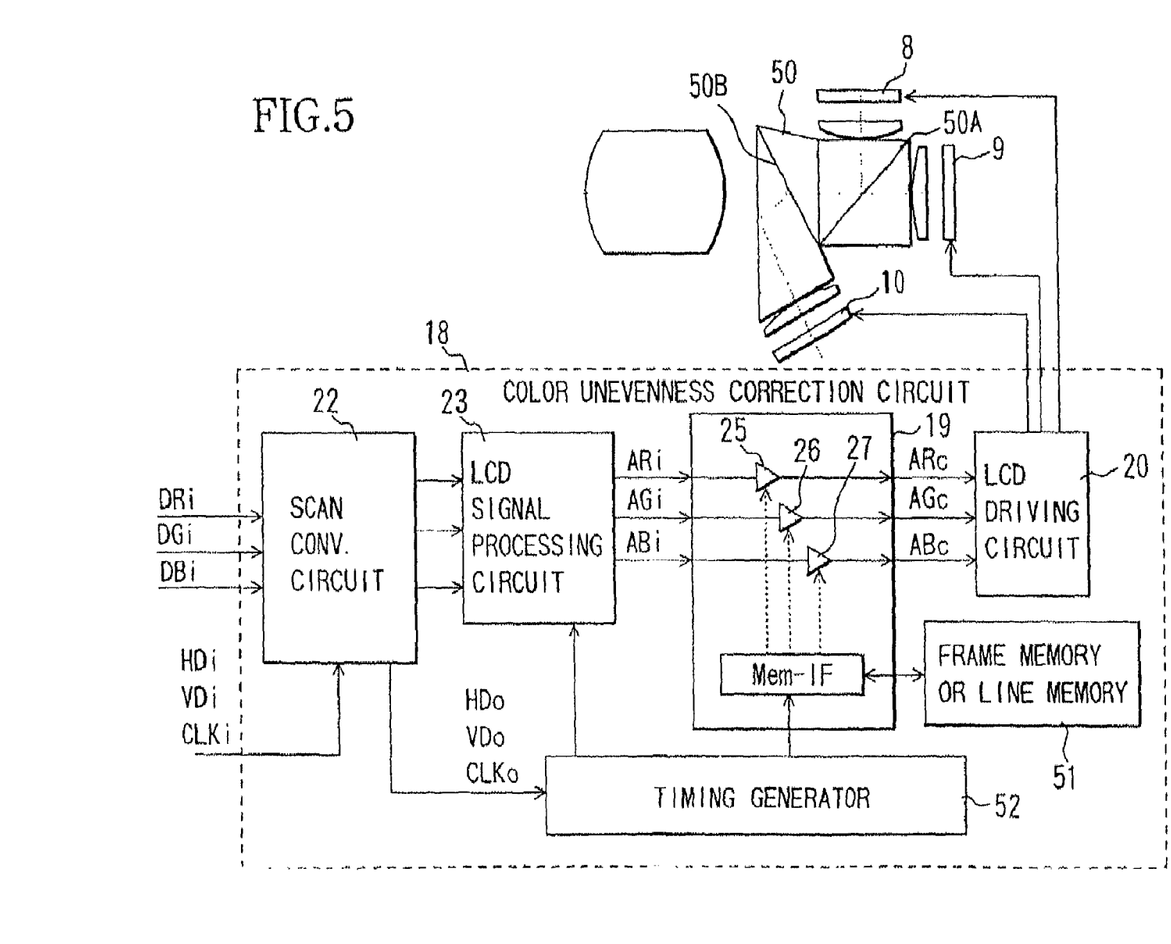
FIG. 5 shows a structure of a signal-processing circuit in a liquid crystal projector, which is a third embodiment of the present invention.

FIG. 5 shows the structure of a liquid crystal projector (projection type image display device), which is another embodiment of the present invention. In this embodiment, the same reference symbols as in the above embodiment are given to the same constituent elements as in the above embodiment.

In this embodiment, dichroic membranes 50A and 50B that are provided in the color synthesizing dichroic prism 50 are each formed with a gradient membrane in which thickness or a refractive index slantingly varies in a specific direction. The optical system of FIG. 5 has the same structure as that of FIG. 2, except for the color synthesizing dichroic prism 50.

Since the gradient membrane are used as dichroic membranes 50A and 50B, light that passes through any position of the liquid crystal panels 8, 9 and 10 becomes equal in the incidence angle upon the dichroic membranes 50A and 50B in the horizontal direction that corresponds to the characteristic inclination direction of the gradient membrane, and therefore color unevenness can be prevented from occurring in the horizontal direction.

However, as in the above embodiment, an electric color unevenness correction is needed in the vertical direction.

When gradient membranes used for the dichroic membranes 50A and 50B are reduced in cost, there is a case in which unevenness in characteristics occurs, and color unevenness cannot be completely corrected even in the horizontal direction. In this case, as in the above embodiment, color unevenness correction processing must be electrically performed in the horizontal and vertical directions.

Figure 6:
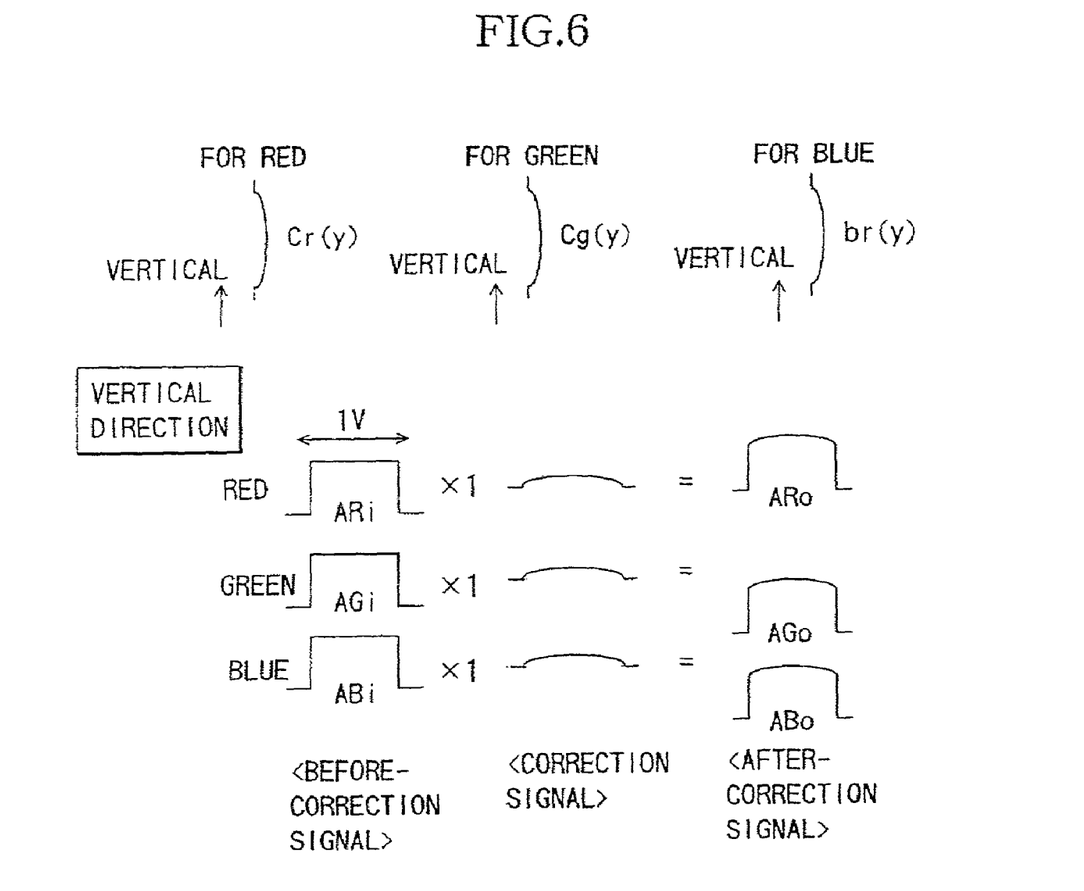
FIG. 6 explains the operation of a color unevenness correction circuit in the third embodiment.

FIG. 6 shows an example of a correcting operation when a uniform white (gray) color is displayed on the liquid crystal panels 8, 9 and 10. Color unevenness in the horizontal direction can be almost completely corrected by use of a properly formed gradient membrane, or film. However, since color unevenness in the vertical direction cannot be corrected, correction data to be stored in a frame memory or a line memory 51 is created to cancel the color unevenness in the vertical direction.

Only one-dimensional data in the vertical direction can be roughly used as correction data. However, if precisely corrected, two-dimensional data may be used as in the above embodiment.

FIG. 6 shows a case in which color unevenness correction processing is performed only in the vertical direction. In this case, the memory 51 can be formed with a line memory for a vertical line.

Image signals (after-correction signals) obtained after completion of corrections are expressed as follows:

$$ARo(y)=Cr(y) \times ARi(y) \quad (10)$$

$$ABo(y)=Cb(y) \times ABi(y) \quad (11)$$

$$AGo(y)=Cg(y) \times AGi(y) \quad (12)$$

wherein Cr(y), Cb(y) and Cg(y) are red correction data, blue correction data and green correction data, respectively, stored in the line memory 50.

Since the liquid crystal panels 8, 9 and 10 driven by use of after-correction signals (ARo, AGo, ABo) have space transmittance characteristics by which color unevenness in the vertical direction is canceled, an image having uniform brightness is displayed on the screen 13.

As described above, according to this embodiment, the color unevenness of the projected image caused by the optical system is corrected by using the gradient membrane in the horizontal direction and by correcting the electric signals input to the liquid crystal panels 8, 9 and 10 in the vertical direction. Therefore, the aforementioned color unevenness can be corrected by a simple, inexpensive structure.

Color unevenness correction processing may be performed at any position between input of digital signal processing unit 22 and input of LCD driving unit 20 according to methods other than the method of FIG. 5 as long as a correction circuit capable of gain control is disposed at each spatial position of a pixel or a pixel area.

In each of the aforementioned embodiments, a description was given of a case in which the prism 11 having the dichroic membrane is used as the color synthesizing optical element. However, without being limited to this prism, the present invention can be applied to a case in which other color synthesizing optical elements, such as an element in which a dichroic membrane is provided on a plate glass, are used.

Further, in each of the aforementioned embodiments, a description was given of a case in which the liquid crystal panel (LCD) is used as the image display element. However, the present invention can also be applied to a case in which image display elements other than the liquid crystal panel are used.

As described above, according to all of aforementioned embodiments, it is possible to correct the nonuniformity (color unevenness) of a brightness level that easily occurs when a lens group with positive refractive power is disposed between a color synthesizing optical element and an image display element by a simple, inexpensive structure irrespective of a horizontal or vertical direction of the projected image, and is possible to project and display an image with high picture quality and with no color unevenness.

Additionally, when a gradient membrane is used as a dichroic membrane in order to correct color unevenness in a specific direction, color unevenness in a direction that cannot be optically corrected by this gradient membrane can be electrically corrected with ease.

What is claimed is:

1. A projection type image display device comprising:
   a plurality of image display elements, each of which modulates light rays in accordance with an image signal;
   a color synthesizing optical element, comprising a dichroic film including a gradient film in which its thickness varies in a substantially horizontal direction, the color synthesizing optical element synthesizing the light rays modulated by the plurality of image display elements;
   a projection optical system projecting the light rays synthesized by the color synthesizing optical system onto a projection surface; and
   a signal processing circuit which corrects the image signal such that brightness irregularity in a substantially vertical direction of an image projected by the projection optical system is reduced or cancelled.

2. The projection type image display device according to claim 1, further comprising a line memory which stores correction data used in the signal processing circuit as one-dimensional data of the substantially vertical direction.

3. The projection type image display device according to claim 1, further comprising a positive refractive lens disposed between the image display elements and the color synthesizing optical element,
   wherein an incident angle onto the dichroic film of the light rays condensed by the positive refractive lens varies in the substantially horizontal direction.

4. The projection type image display device according to claim 1, wherein the dichroic film reflects a first color light and transmits a second color light, the first color light being one of a red color light, a green color light and a blue color light with different wavelength regions, and the second color light being one of the other two lights that are not reflected.

5. A projection type image display device comprising:
   a plurality of image display elements, each of which modulates light rays in a substantially rectangular region having a long side extending in a first direction and a short side extending in a second direction in accordance with an image signal;
   a color synthesizing optical element comprising a dichroic film including a gradient film in which its thickness varies in the first direction, the color synthesizing optical element synthesizing the light rays modulated by the plurality of image display elements;
   a projection optical system projecting the light rays synthesized by the color synthesizing optical element onto a projection surface to display a substantially rectangular image having a long side extending in the first direction and a short side extending in the second direction; and
   a signal processing circuit which corrects the image signal such that brightness irregularity in the second direction of the image is reduced or cancelled.

6. A projection type image display device comprising:
   a plurality of image display elements, each of which modulates light rays in accordance with an image signal;
   a color synthesizing optical element, comprising a dichroic film including a gradient film in which its refractive index varies in a substantially horizontal direction, the color synthesizing optical element synthesizing the light rays modulated by the plurality of image display elements;
   a projection optical system projecting the light rays synthesized by the color synthesizing optical system onto a projection surface; and
   a signal processing circuit which corrects the image signal such that brightness irregularity in a substantially vertical direction of an image projected by the projection optical system is reduced or cancelled.

7. A projection type image display device comprising:
   a plurality of image display elements, each of which modulates light rays in a substantially rectangular region having a long side extending in a first direction and a short side extending in a second direction in accordance with an image signal;

a color synthesizing optical element comprising a dichroic film including a gradient film in which its refractive index varies in the first direction, the color synthesizing optical element synthesizing the light rays modulated by the plurality of image display elements;

a projection optical system projecting the light rays synthesized by the color synthesizing optical element onto a projection surface to display a substantially rectangular image having a long side extending in the first direction and a short side extending in the second direction; and a signal processing circuit which corrects the image signal such that brightness irregularity in the second direction of the image is reduce or cancelled.

* * * * *

UNITED STATES PATENT AND TRADEMARK OFFICE
CERTIFICATE OF CORRECTION

PATENT NO. : 6,975,337 B2 Page 1 of 1
APPLICATION NO. : 10/052465
DATED : December 13, 2005
INVENTOR(S) : Toshihiko Yokoyama et al.

It is certified that error appears in the above-identified patent and that said Letters Patent is hereby corrected as shown below:

On the title page, item:
[56] REFERENCES CITED:

FOREIGN PATENT DOCUMENTS,
      "08242427   A" should read --8-242427   A--.
      "2002108298   A" should read --2002-108298   A--.

COLUMN 10:

Line 6, "reduce" should read --reduced--.

Signed and Sealed this

Fifteenth Day of August, 2006

JON W. DUDAS
*Director of the United States Patent and Trademark Office*